United States Patent [19]
Alexander

[11] Patent Number: 5,967,533
[45] Date of Patent: Oct. 19, 1999

[54] STORAGE BIN SYSTEM

[75] Inventor: Brian D. T. Alexander, Holland, Mich.

[73] Assignee: Haworth, Inc., Holland, Mich.

[21] Appl. No.: 08/869,232

[22] Filed: Jun. 4, 1997

Related U.S. Application Data

[60] Provisional application No. 60/019,418, Jun. 7, 1996.

[51] Int. Cl.[6] .................................................. B62B 3/00
[52] U.S. Cl. ........................................................ 280/47.35
[58] Field of Search ............................. 280/47.34, 47.35,
280/35, 64, 143, 144; 211/162; 312/349,
350, 25, 29, 131, 132

[56] References Cited

U.S. PATENT DOCUMENTS 5,193,696  3/1993  Price .......................................... 211/162
5,505,574  4/1996  Piazza ........................................ 211/162
5,653,458  8/1997  Chaparian ................................. 280/656

*Primary Examiner*—Robert J. Oberleitner
*Assistant Examiner*—C. T. Bartz
*Attorney, Agent, or Firm*—Flynn, Thiel, Boutell & Tanis, P.C.

[57] ABSTRACT

A roller-supported base and guide track arrangement for use with stacked storage bins. The stacked bins are removably supported on the wheeled base which has front wheels which are adapted to directly rollingly engage the floor, typically a carpeted floor. The wheeled base also has rear wheels which are rollingly supported and guided on free-standing guide tracks which are positioned directly on the carpeted floor adjacent opposite sides of the base for controlling movement of the base solely due to engagement with the rear wheels thereof. The guide tracks comprise horizontally elongate upright loops which maintain a guided rolling engagement with the rear wheels.

6 Claims, 4 Drawing Sheets

1

STORAGE BIN SYSTEM

Priorty is claimed under 35 USC 119 based on U.S. Provisional Application No. 60/019,418, filed Jun. 7, 1996.

FIELD OF THE INVENTION

This invention relates to a storage bin system for an office-type environment and, more particularly, to an improved system wherein a plurality of storage bins or tubs are supported in stacked relationship on a wheeled base which includes rear wheels engaged within guide tracks defined by horizontally elongate upright track loops for controlling movement of the stack between storage and access positions.

BACKGROUND OF THE INVENTION

Stackable storage bins or tubs are used in offices and the like, although their use is disadvantageous in some use situations since accessing objects stored in the bins typically requires a partial unstacking of some of the bins so as to access any of the bins other than the uppermost one. The unstacking and accessing of the bins is further complicated if the bins are used in a situation wherein the stack is stored under a table top or worksurface, since then the entire stack must be slidably moved outwardly from under the table top to then permit unstacking for accessing of the bin storage compartments.

It is an object of this invention to provide an improved roller-supported base and guide track arrangement for use with a stackable bin storage system, which arrangement facilitates the movement of the stacked bins from a storage position to an access position, and which specifically maintains guidance or control over the stacked bins during movement between these two positions without requiring complex guide or supporting housing structures.

In the improved stackable storage bin arrangement of this invention, the stacked bins are removably supported on a wheeled base which has front wheels which are adapted to directly rollingly engage the floor, typically a carpeted floor. The wheeled base also has rear wheels which are rollingly supported and guided on freestanding guide tracks which are positioned directly on the carpeted floor adjacent opposite sides of the base for controlling movement of the base solely due to the engagement with the rear wheels thereof. The guide tracks, in the illustrated and preferred embodiment, comprise horizontally elongate upright loops which maintain a guided rolling engagement with the rear wheels of the base to limit movement of the base between storage and access positions, and prevent skewing of the stack of bins during the movement. The front rollers of the base maintain direct load-bearing rolling engagement with the floor.

Other objects and purposes of the invention will be apparent to persons familiar with arrangements of this general type upon reading the following specification and inspecting the accompanying drawings.

Figure 1:
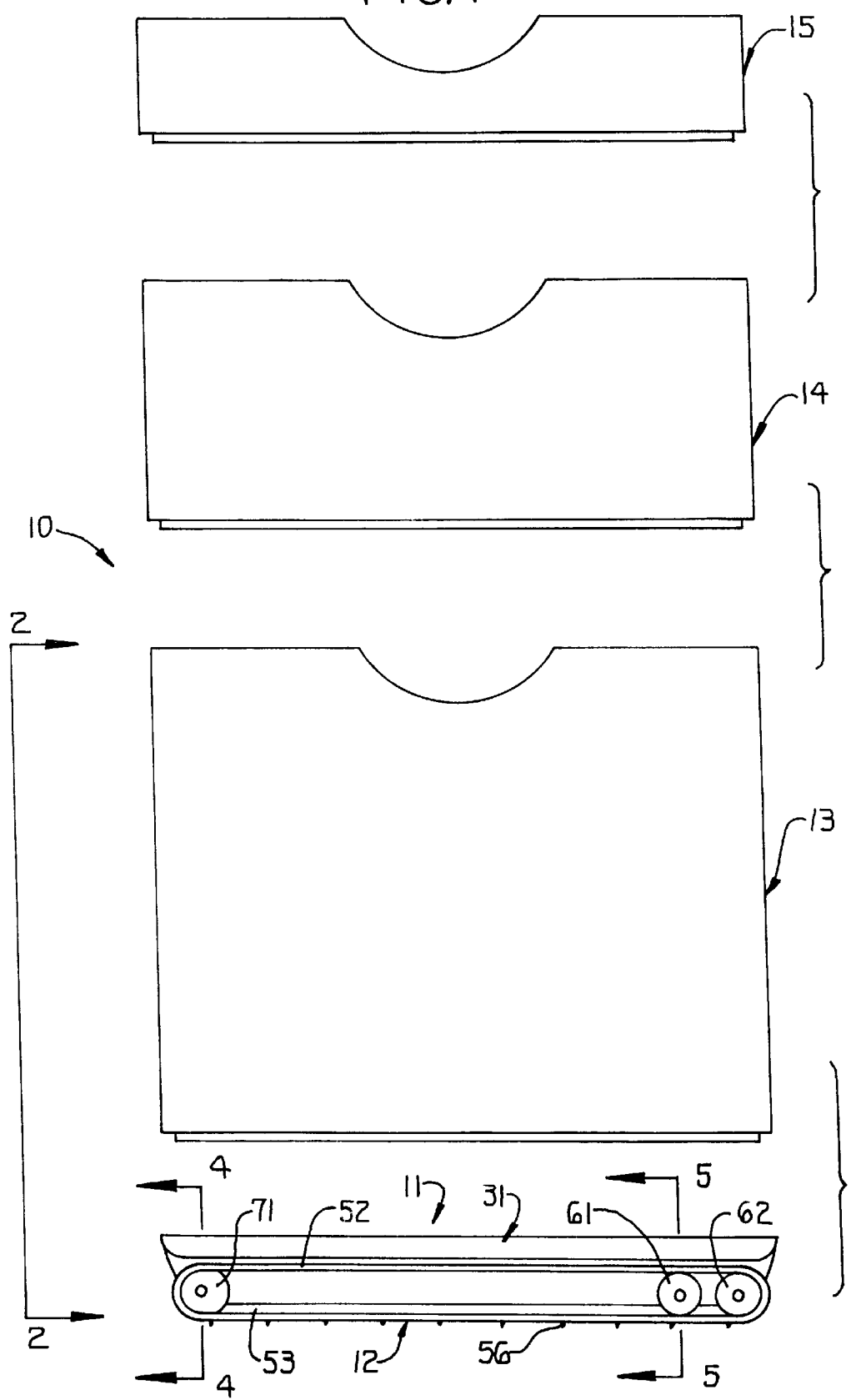
FIG. 1 is a side elevational view of the storage arrangement according to the present invention, and showing the stackable bins in vertically separated condition for purposes of illustration.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will be used to refer to movement of the wheeled base away from the storage position of FIG. 1 toward the bin access position of FIG. 6, and the word "rearwardly" will refer to the reverse direction of movement of the wheeled base. The words "inwardly" and "outwardly" will refer to directions toward and away from, respectively, the geometric center of the storage arrangement and designated parts thereof. Said terminology will include the words specifically mentioned, derivatives thereof, and words of similar import.

DETAILED DESCRIPTION

Figure 2:
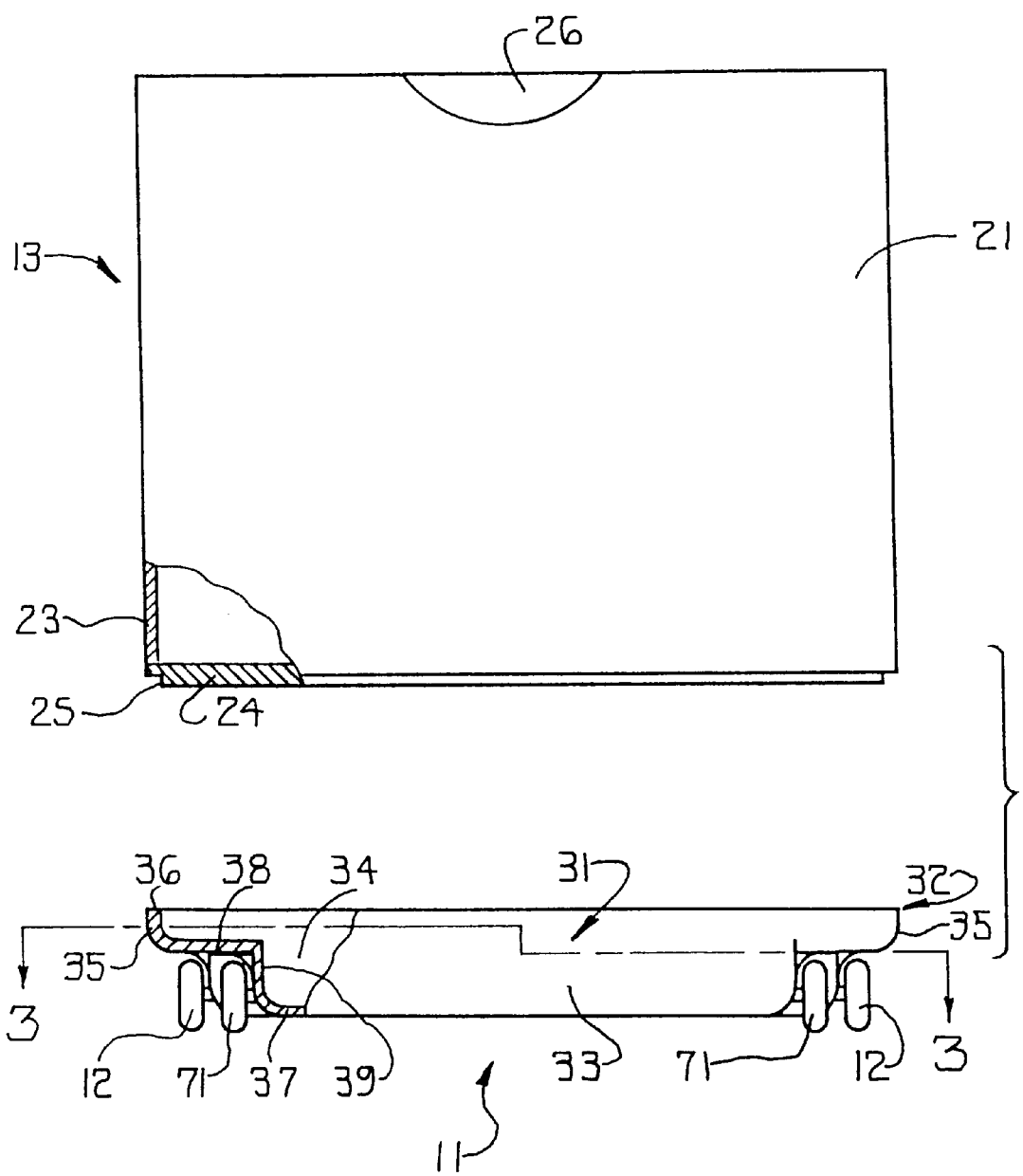
FIG. 2 is a front view taken generally along line 2—2 in FIG. 1 and showing solely the lowermost bin and the wheeled base for convenience in illustration.

Referring to the drawings and specifically FIGS. 1 and 2, there is illustrated a stackable storage bin assembly 10 according to the present invention. This assembly includes a wheeled base or car 11 which adjacent opposite sides thereof cooperates with a pair of guide tracks 12 which are stationarily supported directly on a floor, such as a carpeted floor. A lower bin or tub 13 is adapted to be removably vertically seated on the wheeled base 11 by means of a nesting-type engagement therebetween, and additional bins or tubs are in turn stacked thereabove. In the illustrated embodiment there is provided a second or intermediate bin 14 which nestingly stacks on top of the base bin 13, and an upper bin 15 in turn nestingly seats on top of the intermediate bin 14. The bins 13, 14 and 15 in the illustrated embodiment are identical except for having different side wall heights and respectively represent bins having deep, intermediate and shallow storage compartments therein as ref lected by the height of the side walls.

Figure 7:
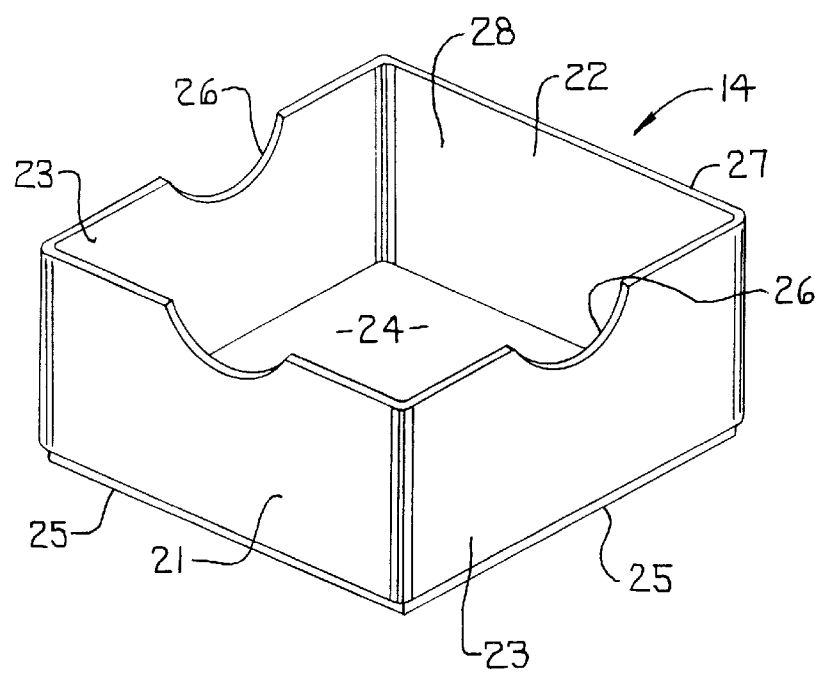
FIG. 7 is an isometric view of a typical bin.

Referring to FIG. 7, there is diagrammatically illustrated a perspective view of a typical storage bin or tub, such as the intermediate bin 14. The bin includes generally parallel front and rear vertical end walls 21 and 22, respectively, which are rigidly joined by generally parallel side walls 23. These walls define a generally rectangular tubular side wall construction which, in the illustrated embodiment, is square. The lower edges of the vertical side walls are joined to a generally horizontally extending bottom wall 24. The lower corner edges of the bin, where the side walls join to the bottom wall, are recessed to define a corner notch or recess 25 which is of an annular or endless configuration extending around the entire bottom of the storage bin. The side walls of the bin are provided with hand openings 26 which open downwardly from upper edges 27 of several of side walls, including at least the end walls 23, and also the front wall 25 in the illustrated embodiment. The bin thus defines therein an enlarged storage compartment 28 which is accessible solely through the open top.

All of the bins are constructed generally the same except for the variation in the height of the side walls, and the bottom notch or recess 25 functions as a stacking notch for receiving the upper side wall rim of either another bin or of the wheeled base 11, as described hereinafter, to permit the bins to be vertically stacked one on top of another with a vertical nested stacking relationship being provided between adjacent bins. This construction of the bins, and the vertical stacking thereof, is generally conventional.

Figure 3:
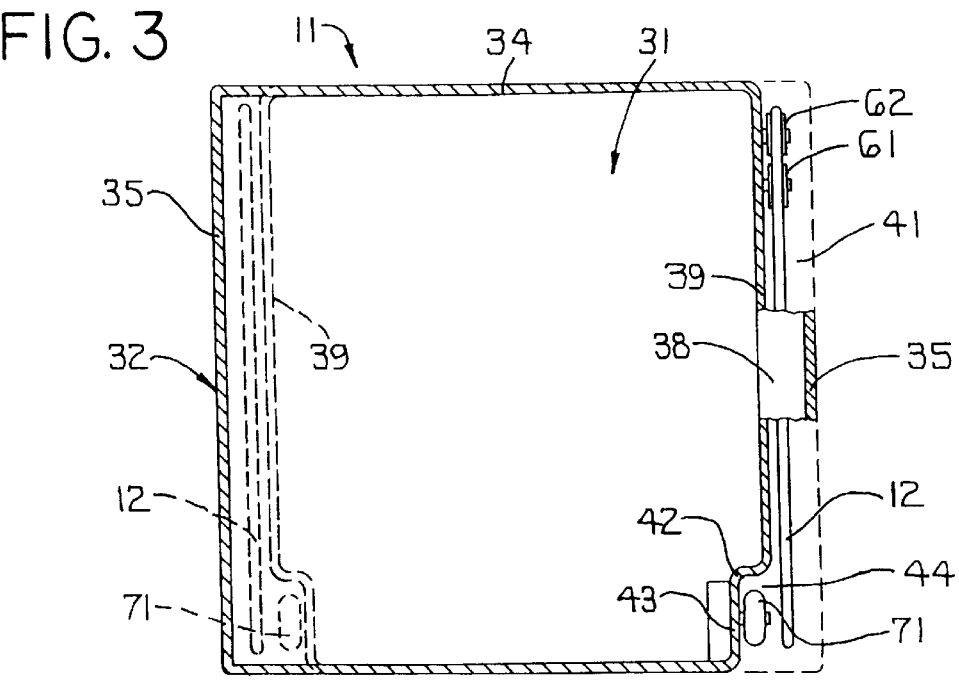
FIG. 3 is a sectional view taken generally along line 3—3 in FIG. 2.

Considering now the construction of the wheeled base and referring to FIGS. 1–6, the wheeled base is formed primarily by a shallow upwardly-opening boxlike member 31 which is preferably formed of one piece and includes an upwardly projecting peripheral side rim 32 which has a rectangular or square configuration so as to project into the nesting groove 25 defined around the bottom of each storage bin. This side rim 32, as illustrated by FIG. 3, includes generally parallel front and back upwardly-projecting side flanges 33 and 34, respectively, which are rigidly joined together by generally parallel upwardly-projecting end side flanges 35. All of these flanges terminate in an upper free edge 36. The front and back flanges 33 and 34 at their lower ends are integrally and fixedly joined to opposite edges of a generally horizontally extending bottom wall 37. The edge flanges 35 project downwardly through a lesser vertical extent and at lower edges are integrally joined to intermediate bottom walls 38 which are provided solely along opposite sides of the base member 31, with these bottom walls 38 being spaced upwardly relative to the primary bottom wall 38. The raised bottom walls 37 at their inner ends are in turn integrally joined to vertical edge flanges 39 which project downwardly and are rigidly joined to opposite side edges of the primary bottom wall 37. These bottom edge flanges 39 are thus spaced inwardly relative to the upper edge flanges 35 and, due to the connection therebetween by the raised bottom walls 38, result in the defining of a generally Z-shaped wall configuration which defines thereunder a notchlike space 41 which extends longitudinally along the lower side corner of the bin in the front-to-back direction thereof. This space 41 accommodates therein the guide track 12 as explained hereinafter.

The lower inwardly offset side flange 39 projects across substantially the full front-to-back extent of the bin except, in the vicinity of the front of the bin, this wall 39 is formed with a generally Z-shaped inward offset therein. More specifically, this inward Z-shaped offset includes an inward offset wall 42 which projects transversely inwardly from the lower side flange 39, and this offset wall 42 in turn at its inner end joins to a forwardly projecting lower side wall flange part 43 which projects forwardly in generally inwardly spaced relation from the lower side wall flange 39 for connection to the front flange 33. The offset created by the flange parts 42 and 43 result in the elongate notch or space 41 being provided with a front space or notch part 44 which is of increased transverse width, with this widened notch part 44 opening toward the front side of the bin.

Considering now the guide tracks 12, each is formed as a generally horizontally elongate upright loop 51, with the track-defining loop being disposed directly under each of the raised bottom walls 38 so as to extend in the front-to-back direction of the base and bin arrangement. The elongate track loop 51 includes generally parallel but horizontally elongate upper and lower rails 52 and 53 which are vertically spaced one above the other, with these rails 52 and 53 being rigidly joined at front and rear ends thereof by respective front and rear semi-circular end loop parts 54 and 55. The track-defining loop 51 is preferably formed as a continuous endless one-piece loop by being suitably formed from an elongate metal rod which is suitably deformed into a loop, with the free ends of the rod then being suitably fixed together as by welding to define a continuous endless loop. The rod defining the loop in the illustrated embodiment is of circular cross section.

The looplike track 12 which is disposed under each side edge of the wheeled base is supported in a generally upright freestanding manner directly in supportive engagement with the floor, preferably a carpeted floor, and for this purpose the lower rail 53 is preferably provided with a plurality of downwardly projecting cleats 56 thereon at spaced intervals longitudinally therealong, which cleats project downwardly to effect a gripping engagement with the carpet to stationarily hold the looplike track securely in position on the carpeted floor.

As illustrated by FIG. 1, the looplike track 12 is horizontally elongated so as to have a length which generally corresponds to, but is typically slightly less than, the maximum front-to-rear length of the wheeled base 11.

To rollingly support the wheeled base 11, the latter includes a pair of rear wheels mounted on the base member 31 adjacent each rear corner thereof. More specifically, each pair of rear wheels includes a front rear wheel 61 and a rear wheel 62, with these rear wheels 61 and 62 being positioned in closely adjacent relationship one behind the other. The wheels 61 and 62 are disposed within the rearward end of the notch or space 41 whereby they are positioned under the raised bottom wall 38 in close proximity to the outer surface of the lower side flange 39. Each of the rear wheels 61 and 62 has a generally concave surface or tread profile defined by a surrounding annular groove 64 which results in the wheel having radially outwardly projecting side rims 63 adjacent opposite axial sides thereof. Each wheel 61 and 62 is rotatably supported on the cantilevered end of a support shaft 65 which is fixed to and projects outwardly from the adjacent lower side wall flange 39, which support shaft has a longitudinal axis 66 which defines the rotational axis of the respective wheel 61 and 62.

Figure 5:
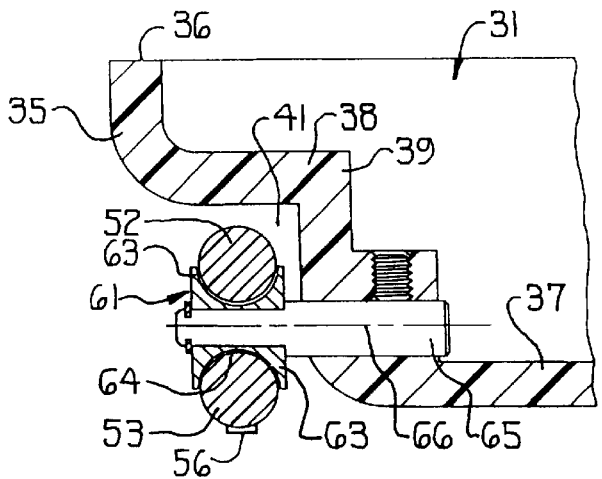

As illustrated in FIG. 5, each wheel 61 and 62 projects into the vertical space defined between the upper and lower guide rails 52 and 53 so that the wheel, due to its surrounding annular groove, effectively rotatably seats on and generally conforms to the cross section of the lower rial 53. At the same time, the wheel is sized so that the side rims 63 project upwardly so as to at least partially sidewardly embrace the upper rail 52 to thus provide a relationship which assists in maintaining the upright relationship of the looplike track 12, and which also ensures a proper guiding and transverse securement of the wheeled base relative to the track.

One of the side rims 63 associated with each wheel 61 and 62 will be partially relieved, as by being provided with a flat along an arcuate sector thereof, to facilitate sideward insertion of the wheel into the vertical space between the track rails 52 and 53.

By providing a pair of rear wheels 61 and 62 in adjacent but slightly spaced front-to-back relationship, with this pair of wheels 61 and 62 being generally aligned so that both are rollingly supported on the lower guide rail 52, this thus results in the load distribution from the wheeled base to the track to be distributed over a longer horizontal extent, and thus provides for increased stability.

Figure 4:
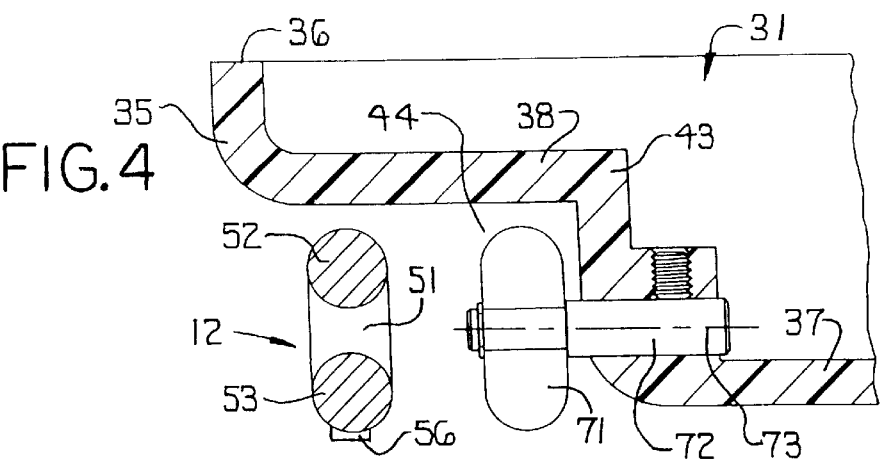
FIGS. 4 and 5 are enlarged, fragmentary sectional views taken respectively along lines 4—4 and 5—5 in FIG. 1.

The wheeled base 11 also has a front wheel 71 associated with each of the front corners of the base member 31. The singular front wheel 71 as associated with each front corner is disposed generally within the enlarged front notch portion 44, whereby the front wheel 71 is also disposed under the raised base wall 38 but is positioned closely adjacent the outer surface of the front lower flange part 43. This thus results in the front wheel 71 being positioned for rolling movement along a path which, while adjacent the track 12, is disposed sidewardly inwardly therefrom as illustrated in FIG. 4. The front wheel 71 is also rotatably supported on the cantilevered outward end of a support shaft 72 which is fixedly supported on the side flange wall 43. This support shaft 72 also defines a longitudinal axis 73 which functions as a rotational axis for the front wheel 71. The axis 73 associated with the front wheel is generally parallel with the axes 66 associated with the rear wheels 61 and 62.

The front wheel 71 is positioned and sized so that it is adapted to directly rollingly engage the floor, such as a carpeted floor. The lower periphery of the front wheel 71, as shown in FIG. 4, is disposed at generally the same elevation as the lower periphery of the bottom track rail 53.

The storage bin arrangement will normally be utilized in a fashion whereby a first bin such as the bin 13 in FIG. 1 will be vertically nestably stacked directly on the wheeled base 11, with the wheeled base being maintained in the retracted storage position indicated by FIG. 1. Additional bins such as 14 and 15 will then be stacked upwardly in nesting relationship above the lower bin 13. The wheeled base, when in this retracted position, is disposed so that the rear wheels 61 and 62 are supported directly on the lower track rail 53 adjacent the rearward end of the loop 12, and the front wheels 71 are positioned directly adjacent but spaced sidewardly inwardly from the front ends of the respectively adjacent looplike guide tracks 12, but these front wheels 71 are disposed in direct rolling engagement with the floor.

Figure 6:
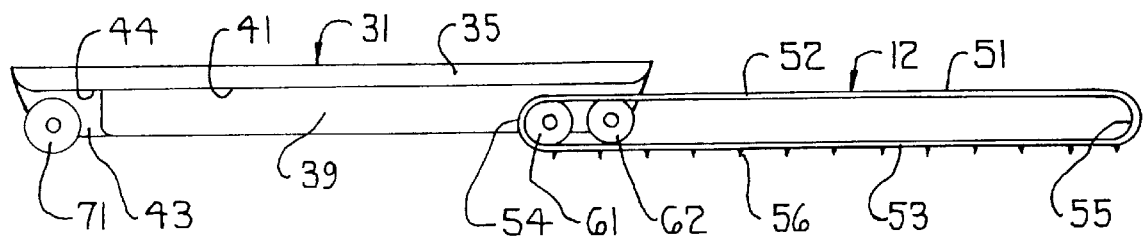
FIG. 6 is a side view of solely the wheeled base and track arrangement and showing the base in its forward or extended position for permitting access to the stacked bins.

When access to the storage bins is desired, a user can access the front of the stack of bins, such as by engaging the hand opening formed in the front wall of the lowermost bin 13, and then pulling the stack of bins forwardly causing the wheeled base 11 to roll forwardly into the extended position as illustrated by FIG. 6. During this forward rolling extension of the wheeled base, the front wheels 71 are directly rollingly supported on the carpeted floor, whereas the rear wheels 61 and 62 roll along the lower track rails 53 until the front rear wheels 61 reach the forward end of the guide tracks, thereby defining the fully extended position of the storage arrangement. The individual bins can then be unstacked and accessed. Once use of the bins has been completed, the bins can be restacked on the wheeled base, and the wheeled base and stacked bins rollingly returned to the storage position of FIG. 1.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A stackable storage bin arrangement for use in an office-type environment, comprising:

a plurality of upwardly-opening boxlike storage bins, each said bin having a stacking recess around a bottom of the respective bin to cooperate with an upper top rim associated with a further said bin to permit plural said bins to be vertically nestably stacked one on top of another;

a wheeled base for permitting a stack of bins to be supported thereon, the wheeled base having a structure cooperating with the stacking recess of the lowermost bin of the stack to permit the stack of bins to be supported thereon;

said wheeled base having a rear support wheel rotatably mounted thereon adjacent each rear corner of the base, and also having a front support wheel rotatably mounted thereon adjacent each front corner of the base, said front wheels being positioned sidewardly inwardly relative to the position of said rear wheels so that the path of travel of the front wheels is generally parallel with but sidewardly offset inwardly relative to the path of travel of the rear wheels; and a pair of independent guide tracks disposed adjacent opposite sides of said wheeled base and being elongated generally along the front-to-back direction of the wheeled base throughout substantially the length thereof, each said guide track including a generally horizontally elongated lower guide rail which stationarily rests directly on the floor and has the respectively adjacent rear wheel rollingly supported thereon, said guide rail and said rear wheel having cooperating side flange structures for preventing sideward displacement of the rear wheel relative to the lower guide rail, and said front wheels being positioned inwardly sidewardly adjacent the guide rail and disposed for direct rolling and supporting engagement with the floor.

2. A bin arrangement according to claim 1, wherein said rear wheels respectively have radially projecting side flanges which overlap said lower guide rail.

3. A bin arrangement according to claim 1, wherein at least one of said guide tracks is defined by a horizontally-elongated loop which includes a horizontally elongated upper guide rail which is generally parallel to and spaced upwardly above said lower guide rail, said respectively adjacent rear wheel being vertically confined between said upper and lower guide rails.

4. A stackable storage bin arrangement for use in an office-type environment, comprising:

a plurality of upwardly-opening boxlike storage bins, each said bin having a stacking recess around a bottom of the respective bin to cooperate with an upper top rim associated with a further said bin to permit plural said bins to be vertically nestably stacked one on top of another;

a wheeled base for permitting a stack of bins to be supported thereon, the wheeled base having a structure cooperating with the stacking recess of the lowermost bin of the stack to permit the stack of bins to be supported thereon;

said wheeled base having a rear support wheel rotatably mounted thereon adjacent each rear corner of the base, and also having a front support wheel rotatable mounted thereon adjacent each front corner of the base, said front wheels being positioned sidewardly inwardly relative to the position of said rear wheels so that the oath of travel of the front wheels is generally parallel with but sidewardly offset inwardly relative to the path of travel of the rear wheels; and a pair of independent guide tracks disposed adjacent opposite sides of said wheeled base and being elongated generally along the front-to-back direction of the wheeled base throughout substantially the length thereof, each said guide track including a generally horizontally elongated lower guide rail which stationarily rests directly on the floor and has the respectively adjacent rear wheel rollingly supported thereon, said guide rail and said rear wheel having cooperating side flange structures for preventing sideward displacement of the rear wheel relative to the lower guide rail, and said front wheels being positioned inwardly sidewardly adjacent the guide rail and disposed for direct rolling and supporting engagement with the floor, each of the guide tracks being defined by a horizontally-elongated continuous loop which is disposed in a vertically upright position on the floor and includes a horizontally elongated upper guide rail which is generally parallel to and spaced upwardly a small distance above the horizontally elongated lower guide rail, said rear wheel being vertically confined between said upper and lower guide rails and having radially outwardly projecting side flanges which vertically overlap both of said upper and lower guide rails.

5. A bin arrangement according to claim 4, wherein the guide track loop provided adjacent one side of the wheeled base is wholly independent of and free of structural connection to the guide track loop positioned adjacent the other side of the wheeled base except for the floor on which said guide track loops rest and the wheeled base supported between said guide track loops, wherein said base member has bottom wall portions and side wall portions, and wherein said guide track loops are disposed directly under said bottom wall portions of said wheeled base and are sidewardly spaced inwardly from said side walls associated with said wheeled base.

6. A stackable storage bin arrangement for use in an office-type environment, comprising:

a plurality of upwardly-opening boxlike storage bins, each said bin having a stacking recess around a bottom of the respective bin to cooperate with an upper top rim associated with a further said bin to permit plural said bins to be vertically nestably stacked one on top of another;

a wheeled base for permitting a stack of bins to be supported thereon, the wheeled base having a structure cooperating with the stacking recess of the lowermost bin of the stack to permit the stack of bins to be supported thereon;

said wheeled base having a rear support wheel rotatably mounted thereon adjacent each rear corner of the base, and also having a front support wheel assembly rotatably mounted adjacent a front side of said base, said front support wheel assembly being positioned sidewardly inwardly relative to the position of said rear wheels so that the path of travel of the front support wheel assembly is generally parallel with and nonoverlapping to the path of travel of the rear wheels; and a pair of independent guide tracks disposed adjacent opposite sides of said wheeled base and being elongated generally along the front-to-back direction of the wheeled base throughout substantially the length thereof, each said guide track including a generally horizontally elongated lower guide rail which stationarily rests directly on the floor and has the respectively adjacent rear wheel rollingly supported thereon, said guide rail and said rear wheel having a cooperating flange structure for preventing sideward displacement of the rear wheel relative to the lower guide rail, and said front support wheel assembly being positioned inwardly sidewardly spaced from the guide rails and being disposed for direct supportive engagement with the floor.

* * * * *

UNITED STATES PATENT AND TRADEMARK OFFICE
CERTIFICATE OF CORRECTION

PATENT NO. : 5,967,533
DATED : October 19, 1999
INVENTOR(S) : Brain D.T. Alexander It is certified that error appears in the above-identified patent and that said Letters Patent is hereby corrected as shown below:

Column 6, line 46; change "rotatable" to ---rotatably---.
line 50; change "oath" to ---path---.

Signed and Sealed this

First Day of August, 2000

Attest:

Q. TODD DICKINSON

Attesting Officer          Director of Patents and Trademarks